US007586932B2

(12) United States Patent
Chou et al.

(10) Patent No.: US 7,586,932 B2
(45) Date of Patent: Sep. 8, 2009

(54) CONTENTION WINDOW ADJUSTMENT METHODS CAPABLE OF LOAD-ADAPTIVE BACKOFF IN A NETWORK AND MACHINE-READABLE STORAGE MEDIUM THEREFOR

(76) Inventors: Zi-Tsan Chou, 3 Fl., No. 17, Lane 383, LinSen N. Rd., Taipei City (TW); Jen-Yi Pan, 5 Fl., No. 7, Alley 12, Lane 400, ZhongHe Rd., ZhongHe City, Taipei County (TW); I-Hung Lin, No. 387, XuZhou St., Taitung City, Taitung County (TW)

( * ) Notice: Subject to any disclaimer, the term of this patent is extended or adjusted under 35 U.S.C. 154(b) by 546 days.

(21) Appl. No.: 11/228,201

(22) Filed: Sep. 19, 2005

(65) Prior Publication Data
US 2006/0245447 A1 Nov. 2, 2006

(30) Foreign Application Priority Data
Apr. 27, 2005 (TW) .............................. 94113448 A

(51) Int. Cl.
*H04L 12/413* (2006.01)
(52) U.S. Cl. .................................................... 370/445
(58) Field of Classification Search ................ 370/445, 370/447, 448–489, 446
See application file for complete search history.

(56) References Cited

U.S. PATENT DOCUMENTS

| | | | | |
|---|---|---|---|---|
| 6,965,942 B1* | 11/2005 | Young et al. | ................ | 709/232 |
| 7,260,081 B2* | 8/2007 | Lee et al. | .................... | 370/348 |
| 7,376,143 B2* | 5/2008 | Liu | ............................ | 370/448 |
| 2004/0093421 A1* | 5/2004 | Peng et al. | ................. | 709/232 |
| 2004/0100936 A1* | 5/2004 | Liu et al. | .................... | 370/345 |
| 2004/0264423 A1* | 12/2004 | Ginzburg et al. | ............ | 370/338 |
| 2005/0239474 A9* | 10/2005 | Liang | ......................... | 455/454 |
| 2005/0271019 A1* | 12/2005 | Yuan et al. | .................. | 370/338 |
| 2007/0019665 A1* | 1/2007 | Benveniste | ................. | 370/445 |

* cited by examiner

*Primary Examiner*—Kwang B. Yao
*Assistant Examiner*—Candal Elpenord
(74) *Attorney, Agent, or Firm*—Schwabe, Williamson & Wyatt, P.C.

(57) ABSTRACT

A contention window adjustment method capable of load-adaptive backoff (LAB) function in a network. At least one middle contention window ($CW_{mid}$) is set for a station. If the contention window (CW) of a station is greater than $CW_{mid}$, then that station considers that the network traffic load is heavy. Similarly, if the CW value of a station is no more than $CW_{mid}$, then that station considers that the network traffic load is light. If collisions occur when the station is transmitting data frames, CW is doubled. Once the station successfully transmits the data frame, CW is decreased by different ratios according to the network traffic load.

11 Claims, 3 Drawing Sheets

CONTENTION WINDOW ADJUSTMENT METHODS CAPABLE OF LOAD-ADAPTIVE BACKOFF IN A NETWORK AND MACHINE-READABLE STORAGE MEDIUM THEREFOR

BACKGROUND

The invention relates to medium access controls, and more particularly, to contention window adjustment methods capable of Load-Adaptive Backoff (LAB for short) in a network.

The media access control (MAC) protocol defines data transferring methods for stations (communication devices, such as laptops, personal digital assistants, mobile phones, and others) in a medium-shared network. The station following a carrier sense multiple access (CSMA for short) protocol must detect whether the medium is busy before sending a frame. Networks with MAC methods based on CSMA comprise wireless local area networks (WLAN) conforming to the Institute of Electrical and Electronic Engineers (IEEE) 802.11 standard, ultra wideband (UWB) networks conforming to IEEE 802.15.3 standard, wireless sensor networks (WSNs) conforming to the IEEE 802.15.4 standard, Ethernets conforming to the IEEE 802.3 standard, and others. Several MAC methods, including IEEE 802.3, 802.11, 802.15.3, and 802.15.4 standards, utilize the Binary Exponential Backoff (BEB) algorithm to adjust the contention window (CW) to avoid or resolve collisions.

In this invention, we take IEEE 802.11 for example to describe the operations of BEB. IEEE 802.11 defines two access functions: one is distributed coordination functions (DCF), and the other is point coordination functions (PCF). Stations complying with the wireless fidelity (Wi-Fi) specification must support DCF. DCF employs the Carrier Sense Multiple Access with Collision Avoidance (CSMA/CA) method to transmit frames. If station A wants to send a data frame to station B, then station A should sense the medium before sending a frame. However, even if the medium is idle at this moment, station A cannot immediately transmit a frame. Station A must wait for a period of "DCF Inter Frame Space (DIFS)" time. After the DIFS time passing, station A can transmit data frames. On the other hand, if the medium is busy when station A wants to transmit, then station A defers until the medium is determined to be idle for DIFS, and then station A selects the backoff slots whose number is a random integer between zero and CW−1, where CW denotes the contention window. The backoff time decreases continuously by one slot. It is noteworthy that backoff countdown process may not be always successful. If the medium is determined busy at any time during a backoff slot, then the backoff timer should be frozen. When the channel is sensed idle again for more than a DIFS, the backoff timer can be reactivated. Whenever the backoff timer reaches zero, transmission shall commence. The effect of this DCF procedure is that when multiple stations enter the backoff stage at the same time, then the station choosing the minimum backoff time will win the contention. Upon reception of the data frame, the destination station (station B) shall reply the ACK frame after an elapsed SIFS (Short InterFrame Space). Note that SIFS<DIFS. If the sending station does not hear the ACK signal, it shall resend the data frame after waiting at least an ACK timeout interval or drops that frame when the DCF retry limit is reached. By the 802.11 standard, the backoff time is defined as follows.

BackoffTime=$DUR(0,CW)$*SlotTime, $CWS=CW-1$, where $DUR(0,CW)$ is a function which will return an integer randomly and uniformly between 0 and CW−1. Notice that CW and SlotTime are PHY(physical layer)-specific. For example, when the PHY is Direct Sequence Spread Spectrum (DSSS) defined in IEEE 802.11b, then SlotTime is 20 μs and the possible value of CWS(CW+1) is 32, 64, 128, 256, 512, or 1024.

To resolve collisions, DCF employs BEB and its corresponding retransmission method. FIG. 1 is a schematic view of CWS adjustment using BEB. The values of the maximum contention window ($CW_{max}$) and the minimum contention window ($CW_{min}$) are defined in 802.11. Notice that we define that $CWS=CW+1$, $CWS_{max}=CW_{max}+1$, and $CWS_{min}=CW_{min}+1$ for convenience. Based on BEB, whenever data frame transmission fails, the value of CWS is doubled until CWS equals $CWS_{max}$. Once the data frame transmission succeeds, the value of CWS jumps to $CWS_{min}$ directly.

The drawbacks of BEB are as follows. Even if a station fails to transmit a data frame many times, the value of CW will reduce to $CW_{min}$ once that station successfully transmit a data frame. We believe that this CW value ($CW_{min}$) is too small since the medium contention may be still severe. The inadequate CW value ($CW_{min}$) may incur more collisions, causing the throughput down. In addition, the collided station has a larger CW value, which makes it more difficult to seize the medium than a non-collided station (whose CW value is $CW_{min}$). In other words, collided stations have lower chance to seize the medium. Therefore, BEB cannot support short-term fairness among contending stations.

To support Quality of Service, IEEE 802.11 Task Group E is struggling for defining the 802.11e standard. 802.11e assigns different values of $CW_{max}$ and $CW_{min}$ for different priority access categories. In particular, a higher priority station has smaller values of $CW_{max}$ and $CW_{min}$. Regardless of the priority, the station in 802.11e still follows the BEB to transmit data frames. This implies that the above-mentioned problems may still occur in 802.11e.

As described, the invention discloses a contention window adjustment method capable of load-adaptive backoff (LAB). Compared with BEB, LAB can appropriately adjust the value of CW (CWS) according to traffic load in a network, significantly reducing the collision probability and data transmission delay, thus improving throughput and fairness.

SUMMARY

Contention window adjustment methods capable of load-adaptive backoff (LAB) in a network are provided. In an embodiment of such a method, a middle contention window ($CW_{mid}$) is defined and at least one station is provided. The value of $CW_{mid}$ is between the maximum contention window ($CW_{max}$) and the minimum contention window ($CW_{min}$). When a station transmits a data frame successfully, if its contention window (CW) is greater than $CW_{mid}$, CW is decreased by a ratio parameter p, and if its CW value is less than or equal to $CW_{mid}$, CW is decreased by the second ratio parameter q. The first ratio parameter p is greater than the second ratio parameter q. If a station fails to transmit data frames, the value of CW should be doubled. However, Under any circumstances, the value of CW cannot be greater than $CW_{max}$.

BRIEF DESCRIPTION OF THE DRAWINGS

The invention can be more fully understood by reading the subsequent detailed description and examples of embodiments thereof with reference made to the accompanying drawings, wherein.

DETAILED DESCRIPTION

The invention discloses a contention window adjustment method capable of load-adaptive backoff (LAB) in a network.

According to one embodiment, a machine-readable storage medium is provided for storing a computer program providing a contention window adjustment method capable of load-adaptive backoff (LAB) function in a network, comprising using a computer to perform the steps of: setting a contention window; providing at least one first station and one second station; the first station obtaining backoff time for a reciprocal operation; when the reciprocal operation is complete, the first station transmitting data frames; and when the data frames are successfully transmitted, the first station decreasing the contention window with a ratio parameter.

According to one embodiment, the method further comprises: when the reciprocal operation is complete, the first station determining whether the second station is transmitting data frames; if the second station is transmitting data frames, the first station suspending the reciprocal operation; and if the second station does not transmit any data frames, the first station continuously transmitting the data frames.

According to one embodiment, the method further comprises: defining the maximum contention window, a minimum contention window, and at least one middle contention window; when the data frames transmission is complete, determining whether the contention window of the first station is greater than the middle contention window; if the contention window is greater than the middle contention window, decreasing the contention window with the first ratio parameter; and if the contention window is less than or equal to than the middle contention window, decreasing the contention window with the second ratio parameter.

According to one embodiment, the first ratio parameter is greater than the second ratio parameter.

According to one embodiment, the first ratio parameter is 75%.

According to one embodiment, the second ratio parameter is 50%.

According to one embodiment, the method further comprises: doubling the contention window of the first station.

The invented load-adaptive backoff (LAB) method can appropriately adjust contention window (CW) according to traffic load in a network, greatly reducing collision probability and transmission delay, therefore improving throughput and fairness. Compared with DCF, LAB further defines at least one middle contention window ($CW_{mid}$), except for CW, $CW_{max}$, and $CW_{min}$. $CW_{mid}$ is between $CW_{max}$ and $CW_{min}$ for reflecting the traffic load in a network. For convenience, we let the middle contention window size ($CWS_{mid}$) equal to $1+CW_{mid}$.

Figure 1:
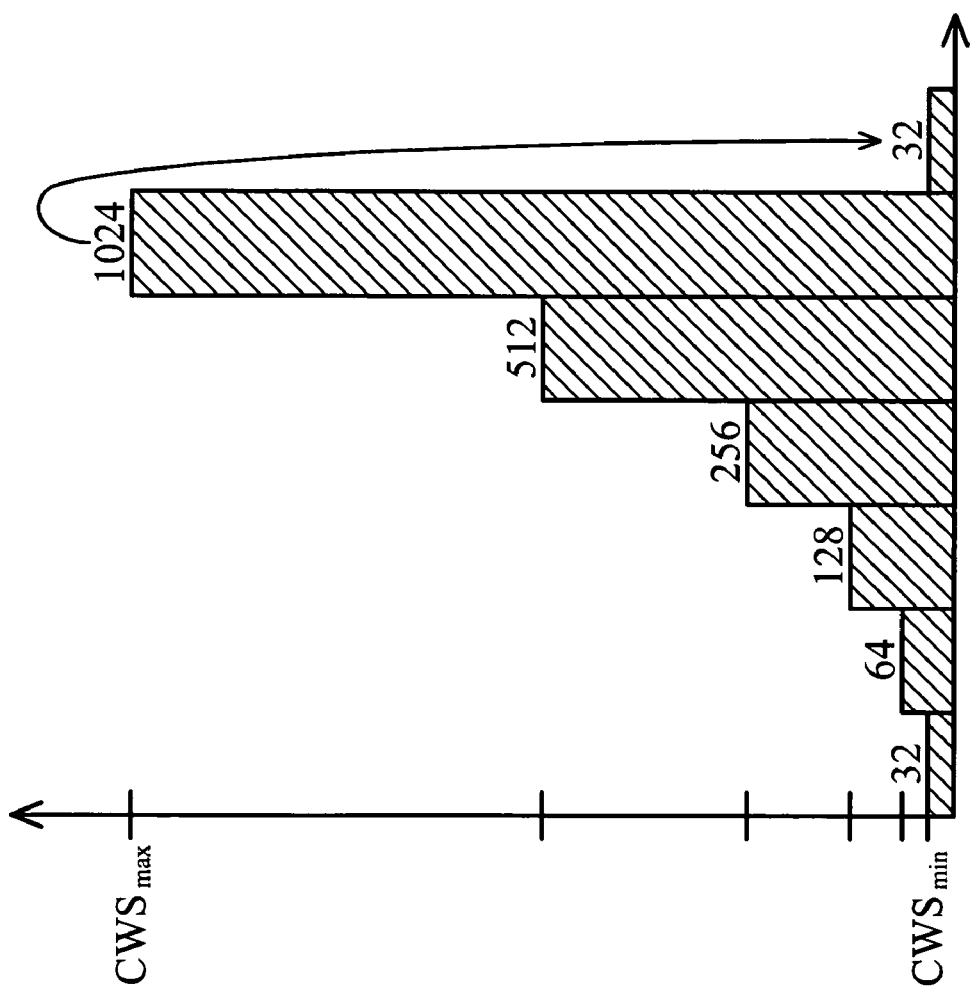
FIG. 1 is a schematic view of contention window adjustment using BEB.
Figure 2:
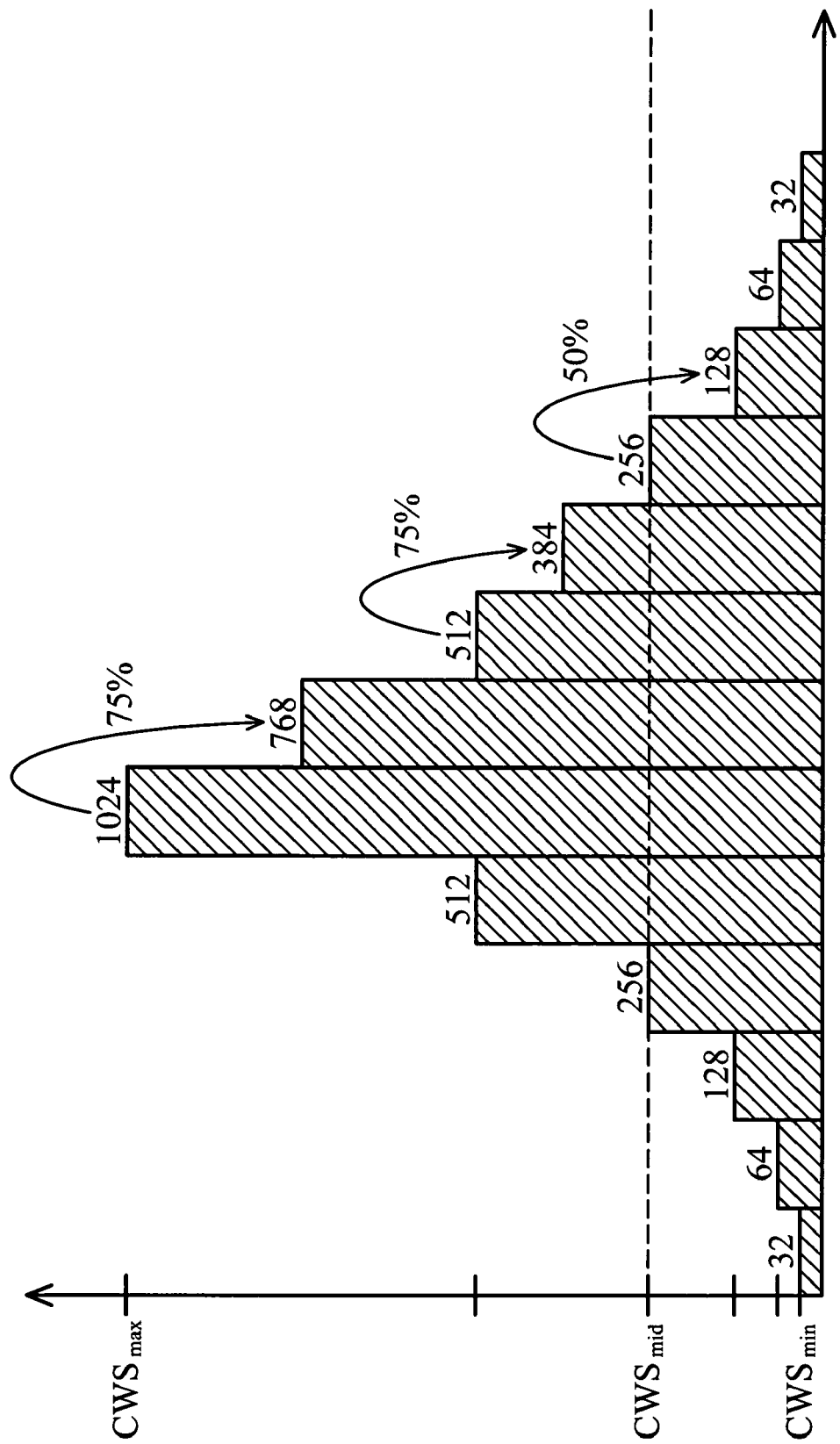
FIG. 2 is a schematic view of an embodiment of contention window adjustment using LAB.

FIG. 2 is a schematic view of an embodiment of contention window adjustment using LAB. In this embodiment, $CWS_{mid}$ is defined as 256. In LAB, a station regards the traffic load heavy when $CWS>CWS_{mid}$.

When a network has a heavy traffic load (CWS=1024 or 512, for example), the CWS of a station is decreased to 75% (the first ratio parameter, p) (i.e. CWS:=CWS*0.75) after a data frame is successfully transmitted. When a network has a light traffic load (CWS=128 or 64, for example), CWS of a station is decreased to 50% (the second ratio parameter, q) (i.e. CWS:=CWS*0.5) after a data frame is successfully transmitted. This process can be described using the following mathematical formulas.

CWS:=min{2*CWS,$CWS_{max}$}, if transmission fails;
CWS:=max{p*CWS,$CWS_{mid}$}, if data transmission succeeds and $CWS>CWS_{mid}$;
CWS:=max{q*CWS,$CWS_{min}$}, if data transmission succeeds and $CWS<CWS_{mid}$. Note that 0<q<p<1 and the "max" and "min" functions return the maximum value and the minimum value from the set respectively.

In this embodiment, when CWS does not equal to 32 or 64, CWS will not be reduced to $CWS_{min}$ even if data frames are successfully transmitted.

Figure 3:
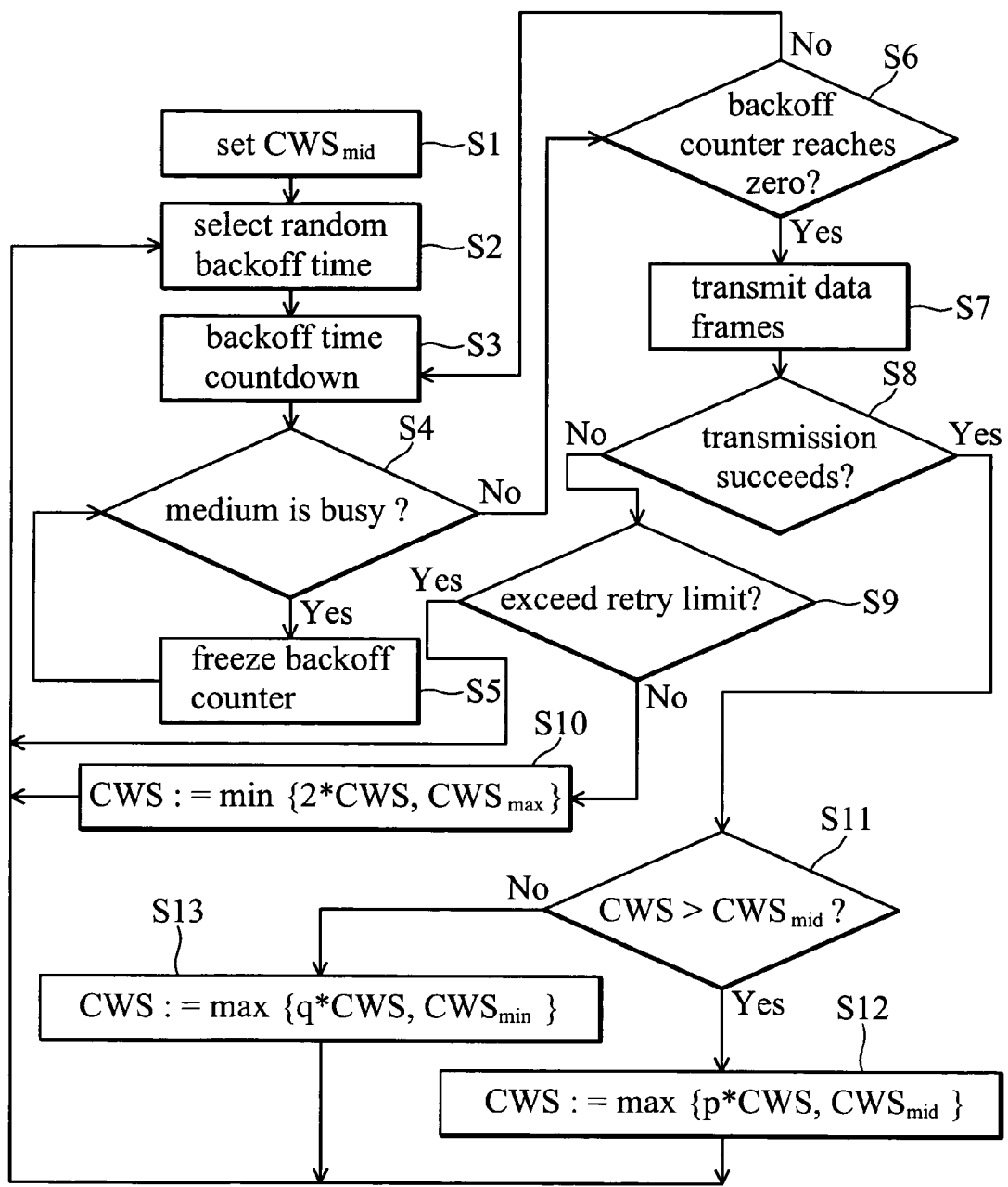
FIG. 3 is a flowchart of an embodiment of a contention window adjustment method capable of load-adaptive backoff (LAB) in a network.

FIG. 3 is a flowchart of an embodiment of a contention window adjustment method capable of load-adaptive backoff (LAB) function in a network.

A plurality of communication devices are first provided in a network. In other words, this network includes at least station A and station B, and these two stations can mutually transmit data frames. In each station, the middle contention window (like $CWS_{mid}$ as described) is set (step S1). Station A selects backoff time randomly according to a contention window (or contention window size (CWS) as described) thereof (step S2) and begins to count down the backoff time via a counter (step S3). During backoff, station A continuously monitors whether the network (medium) is busy (step S4). When the network becomes busy (for example, station B is transmitting), station A freezes the backoff counter (step S5) and performs the carrier sense procedure continuously (step S4).

When the network becomes idle (i.e. station B stops transmitting data frames), station A determines whether the backoff counter reaches zero (step S6), and, if so, station A can transmit a data frame (step S7); if not, the process proceeds to step S3. After sending the data frame, station A waits for the ACK frame. The ACK frame can be used to determine whether that data frame is successfully transmitted (step S8). Upon failure, station A then determined whether the number of retransmission is no less than the retry limit value (step S9). If so, station A drop that data frame. If not, CWS is doubled (CWS:=min{2*CWS, $CWS_{max}$}) (step S10) and then process proceeds to step S2. Note that, under any circumstances, the value of CWS should not exceed the maximum contention window (as with the described $CWS_{max}$).

If station A successfully transmits the data frames, it then determines whether CWS is greater than $CWS_{mid}$ ($CWS>CWS_{mid}$?) (step S11). If so, the traffic load may be heavy. Thus in order to reduce collision probability, CWS is decreased to 75% (CWS:=max{p*CWS, $CWS_{mid}$}, i.e. CWS:=p*CWS and p=0.75) (step S12) and then the process proceeds to step S2. If not, the traffic load may be light. Thus in order to reduce average backoff time, CWS is decreased to 50% (CWS:=max{q*CWS, $CWS_{min}$} i.e. CWS:=q*CWS and q=0.5) (step S13) and then the process proceeds to step S2. Note that, under any circumstances, the value of CWS should be greater than or equal to the minimum contention window (like $CWS_{mid}$ as described).

A contention window adjustment method of the invention can set a plurality of middle contention windows. When two middle contention windows are set, the described process in FIG. 3 may add two more determination conditions, comprising ($CWS > CWS_{mid1}$?), ($CWS_{mid1} < CWS < CWS_{mid2}$?), and ($CWS < CWS_{mid2}$?). When one of the described conditions is met, CWS is multiplied by p, q, or r, where $0 < r < q < p < 1$. When three or more middle contention windows are set, a corresponding adjustment process is implemented based on the described processes. Thus, a contention window adjustment method of the invention can retain higher efficiency in a network.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. A contention window adjustment method providing load-adaptive backoff (LAB) in a network having at least first and second communication stations, the method comprising:
   setting a first contention window;
   defining a middle contention window between a maximum contention window and a minimum contention window;
   providing at least one first station and one second station;
   the first station obtaining backoff time for a reciprocal operation;
   when the reciprocal operation is complete, transmitting a data frame; and
   if the data frame is successfully transmitted, the first station decreasing the first contention window by:
      multiplying the first contention window by a first ratio parameter if the first contention window is greater than the middle contention window; and
      multiplying the first contention window by a second ratio parameter if the first contention window is less than the middle contention window,
   wherein the first ratio parameter is greater than the second ratio parameter.

2. The contention window adjustment method as claimed in claim 1, further comprising:
   when the reciprocal operation is complete, the first station determining whether the second station is transmitting the data frame;
   if the second station is transmitting the data frame, the first station suspending the reciprocal operation; and
   otherwise, the first station resuming a backoff timer and transmitting the data frame if the backoff timer reaches zero.

3. The contention window adjustment method as claimed in claim 2, further comprising:
   if the data frame transmission is complete, determining whether the first contention window is greater than the middle contention window;
   wherein if the first contention window is also equal to the middle contention window, the first station decreases the first contention window by multiplying the first contention window by the second ratio parameter.

4. The contention window adjustment method as claimed in claim 1, wherein the first ratio parameter is 75%.

5. The contention window adjustment method as claimed in claim 1, wherein the second ratio parameter is 50%.

6. An apparatus, comprising:
   a station adapted to transmit a data frame and having a computing device adapted to perform an adjustment of a first contention window, wherein a middle contention window is defined between a maximum contention window and a minimum contention window,
   wherein if the data frame is successfully transmitted, the computing device is adapted to perform the adjustment to decrease the first contention window by:
      multiplication of the first contention window by a first ratio parameter if the first contention window is greater than the middle contention window; and
      multiplication of the first contention window by a second ratio parameter if the first contention window is less than the middle contention window,
   wherein the first ratio parameter is greater than the second ratio parameter.

7. The apparatus of claim 6 wherein if the data frame fails to transmit successfully, the computing device is adapted to perform the adjustment to increase the first contention window by doubling the first contention window.

8. The apparatus of claim 6 wherein the multiplication of the first contention window by the second ratio parameter is also performed by the computing device if the first contention window is equal to the middle contention window.

9. An apparatus, comprising:
   station means for transmitting a data frame; and
   computing device means for performing an adjustment of a first contention window, wherein a middle contention window is defined between a maximum contention window and a minimum contention window,
   wherein if the data frame is successfully transmitted, the computing device means performs the adjustment to decrease the first contention window by:
      multiplying the first contention window by a first ratio parameter if the first contention window is greater than the middle contention window; and
      multiplying the first contention window by a second ratio parameter if the first contention window is less than the middle contention window.

10. The apparatus of claim 9 wherein the first ratio parameter is greater than the second ratio parameter.

11. The apparatus of claim 9 wherein if the data frame fails to transmit successfully, the computing device means performs the adjustment to increase the first contention window by doubling the first contention window.

* * * * *

UNITED STATES PATENT AND TRADEMARK OFFICE
CERTIFICATE OF CORRECTION

| | | |
|---|---|---|
| PATENT NO. | : 7,586,932 B2 | Page 1 of 1 |
| APPLICATION NO. | : 11/228201 | |
| DATED | : September 8, 2009 | |
| INVENTOR(S) | : Chou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this

Twenty-first Day of September, 2010

David J. Kappos
*Director of the United States Patent and Trademark Office*